W. H. LLOYD.
MANUFACTURE OF SLEIGH-KNEES.
No. 171,295. Patented Dec. 21, 1875.
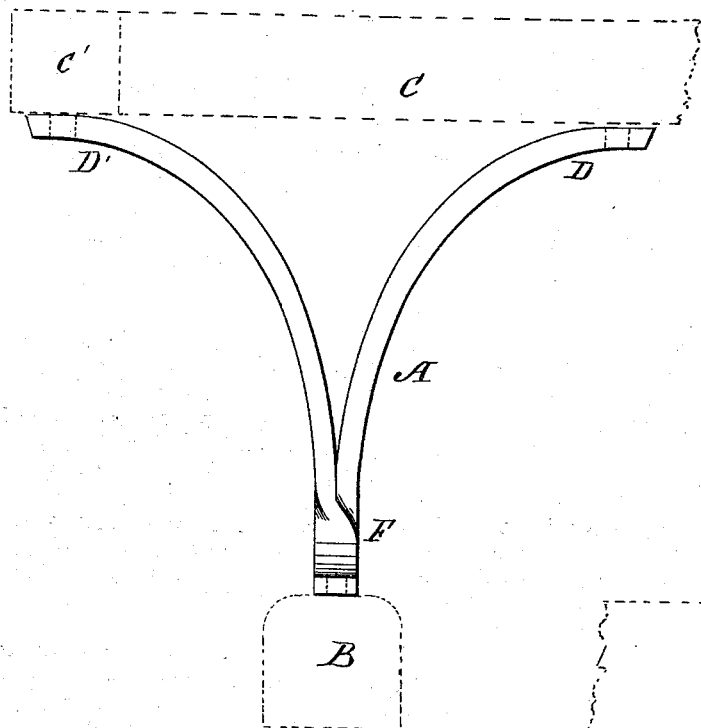
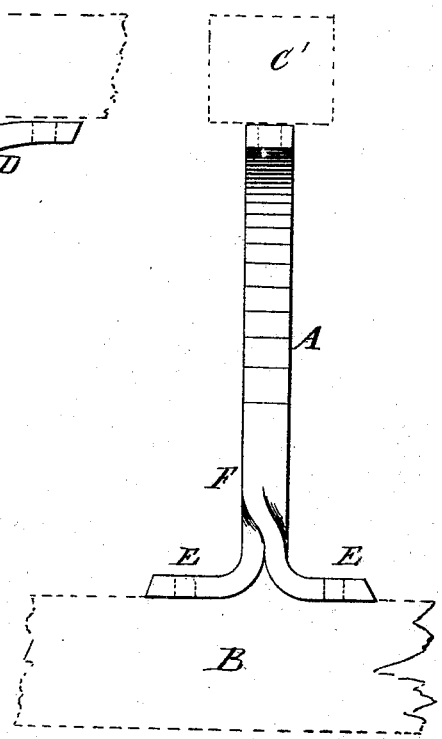

UNITED STATES PATENT OFFICE.

WILLIAM H. LLOYD, OF SPRING VALLEY, MINNESOTA.

IMPROVEMENT IN THE MANUFACTURE OF SLEIGH-KNEES.

Specification forming part of Letters Patent No. 171,295, dated December 21, 1875; application filed January 17, 1874.

*To all whom it may concern:*

Be it known that I, WILLIAM H. LLOYD, of Spring Valley, in the county of Fillmore and State of Minnesota, have invented a new and useful Improvement in Sleigh-Knees, of which the following is a specification:

The invention has for its object to provide a new method of manufacturing sleigh-knees, consisting of welding two wrought-metal bars together at a point near one end, and bending and twisting to adapt them for application to the sleigh body and runner, as hereinafter described.

In the drawing, Figure 1 is a view of the knee, as seen when looking at the side of the sleigh. Fig. 2 is a view when looking lengthwise of the runner.

Similar letters of reference indicate corresponding parts.

A is the sleigh-knee; B, the runner. C is the beam; C', the rave. The inner one of the two curved braces D D' is bolted to the beam, and this brace is somewhat longer than the other. The other brace D supports the end of the beam, and also the rave, the same bolt passing through both. The short arms E E are securely bolted to the top of the runner. This knee is made by welding together two pieces of wrought-iron at the point F, and spreading and curving the parts to form the braces D D', and then spreading the other ends to form the short arms E E, and twisting the welded or solid portion so that the braces D D', and the short arms E E, will be at right angles to each other, as seen in the drawing.

I claim—

The method herein described of forming wrought-iron sleigh-knees, consisting in first welding together at F the curved wrought metal bars D D', and then bending and twisting the upper ends of the latter while in a heated state, so as to form the horizontal arms E E at right angles to the arms D D', substantially as described.

WILLIAM H. LLOYD.

Witnesses:
W. L. KELLOGG,
E. S. BUMSTEAD.